US011475107B2

(12) United States Patent
Baldwin et al.

(10) Patent No.: US 11,475,107 B2
(45) Date of Patent: Oct. 18, 2022

(54) HARDWARE SECURITY

(71) Applicant: HEWLETT-PACKARD DEVELOPMENT COMPANY, L.P., Spring, TX (US)

(72) Inventors: Adrian Baldwin, Bristol (GB); James Robert Waldron, Spring, TX (US); Mike Provencher, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 173 days.

(21) Appl. No.: 16/763,496

(22) PCT Filed: Mar. 12, 2018

(86) PCT No.: PCT/US2018/021941
§ 371 (c)(1),
(2) Date: May 12, 2020

(87) PCT Pub. No.: WO2019/177563
PCT Pub. Date: Sep. 19, 2019

(65) Prior Publication Data
US 2021/0365529 A1    Nov. 25, 2021

(51) Int. Cl.
*G06F 21/00*    (2013.01)
*G06F 21/30*    (2013.01)

(52) U.S. Cl.
CPC .................... *G06F 21/30* (2013.01)

(58) Field of Classification Search
None
See application file for complete search history.

(56) References Cited

U.S. PATENT DOCUMENTS

| | | | | |
|---|---|---|---|---|
| 7,467,370 B2* | 12/2008 | Proudler | ................. | G06F 21/62 |
| | | | | 726/4 |
| 7,986,786 B2* | 7/2011 | Ibrahim | ................ | H04L 9/0825 |
| | | | | 713/193 |
| 8,060,941 B2* | 11/2011 | Jansen | .................... | G06F 21/57 |
| | | | | 726/16 |
| 8,433,923 B2* | 4/2013 | Yasaki | .................. | G06F 21/575 |
| | | | | 726/20 |
| 8,700,893 B2* | 4/2014 | Thom | ................... | H04L 9/3263 |
| | | | | 713/176 |
| 9,111,119 B2 | 8/2015 | Proudler | | |
| 9,361,462 B2* | 6/2016 | Chen | ....................... | G06F 21/57 |
| 9,628,277 B2 | 4/2017 | Futral | | |
| 2006/0129824 A1* | 6/2006 | Hoff | ..................... | H04L 9/3234 |
| | | | | 713/181 |
| 2009/0172639 A1 | 7/2009 | Natu et al. | | |

(Continued)

FOREIGN PATENT DOCUMENTS

CN    101908115 B    9/2013
TW    201737151 A    10/2017

*Primary Examiner* — Maung T Lwin
(74) *Attorney, Agent, or Firm* — HPI Patent Department

(57) ABSTRACT

A device platform, in some examples, comprises a security processor that may create a private/public cryptographic key pair, and data representing evidence of creation of the key pair, provide access to the key pair and data from an operating system component of the device platform, where the public key part of the key pair may be used to verify management commands. The device platform may validate the key pair and data in a trusted execution state.

15 Claims, 4 Drawing Sheets

(56) References Cited

U.S. PATENT DOCUMENTS

| | | |
|---|---|---|
| 2010/0031012 A1 | 2/2010 | Rotondo et al. |
| 2010/0082987 A1 | 4/2010 | Thom et al. |
| 2012/0173885 A1 | 7/2012 | Acar et al. |
| 2012/0174199 A1* | 7/2012 | Perrin .................. G06F 1/1654 726/6 |
| 2015/0379306 A1* | 12/2015 | Zimmer .................. G09C 1/00 713/193 |
| 2017/0155513 A1 | 6/2017 | Acar et al. |
| 2017/0272245 A1 | 9/2017 | Norton |

* cited by examiner

HARDWARE SECURITY

BACKGROUND

Device management can include the use of authorisation certificates which may have been signed using administrator keys to allow a user of the device to access particular software. Security settings or platform level features may be changed by an administrator using a password.

BRIEF DESCRIPTION OF THE DRAWINGS

Various features of certain examples will be apparent from the detailed description which follows, taken in conjunction with the accompanying drawings, which together illustrate, by way of example only, a number of features, wherein.

DETAILED DESCRIPTION

Figure 1:
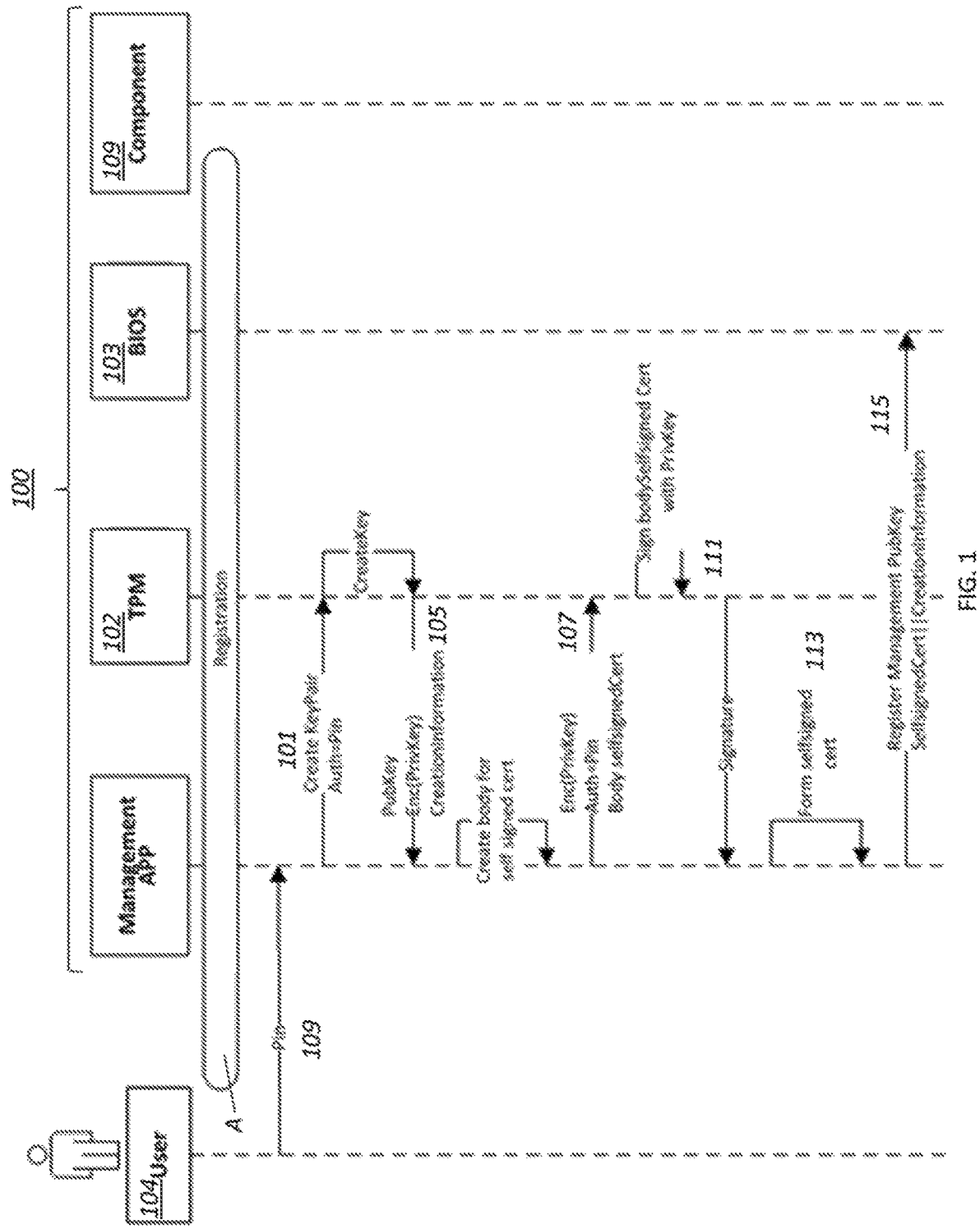
FIG. 1 is a schematic of a registration protocol according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Within a system there are platform level features that can be managed either from a remote management system or from a local console. Such features may include firmware setting including security features, such as unified extensible firmware interface (UEFI) or basic input/output system (BIOS), additional hardware devices linked to the system, and functions running outside of the operating system (OS), such as on an additional processor or within a virtualization layer for example.

Management systems to manage a UEFI/BIOS or hardware functionality can be invoked at boot-time using an administrator password for example. Management can also be performed remotely using an agent that can call an instrumentation interface through to the UEFI/BIOS for example.

A management command can be provided in order to affect changes in configuration settings of a local device, such as firmware settings for example. In a remotely managed device, changes to configuration settings of the device can be signed with a private key controlled by a management application. According to an example, the management application can securely manage the private key used for the signature process from a remote (to the device) location.

According to an example, when management commands are signed by a private key associated with a management application (local or remote), the device being managed can trust the signed command. For example, the device being managed can trust that its public key is associated with the private key being used to sign the command. There may be a process that is provided for registering the public key at the device which then acts as the management authority. For example, the public key may be registered with a firmware component of the device or other component that controls configuration settings or other security settings of the device.

According to an example of a remotely managed case, a certificate can be issued by a trusted authority (such as a certificate authority) to the domain of the enterprise using a name that a user will recognise. In a locally managed example, "self-signed certificates" can be used in which a user or administrator is relied upon to validate the management steps for controlling the device or effecting changes to the device security settings.

According to an example, a security processor or secure crypto-processor in a local device, such as a laptop for example, can form a secure execution environment. The execution environment may be segregated from an operating system or management application of the device. According to an example, the security processor can create a private/public key pair which can be registered with a component of the local device, such as the firmware for example.

According to an example, a device accepting a public key can trust that an associated private key has been created and/or managed within a security processor that is local to the device, i.e. that is on the same platform. This provides trust in the local management of the device.

According to an example, a security processor can use a private key that it has created to sign a management command. For example, a management command may be a command to alter a device configuration setting. The signed command can be sent to a component of the device with which the private/public key pair has been registered.

To register the key for use as a management key the first stage is to generate a public private key pair within a security processor along with creation information. Then the private key is used to create a self-signed certificate also containing the creation information. This certificate is passed through to firmware (e.g. UEFI or BIOS) to register it as a management key. The next time that the device (e.g. laptop) boots or comes out of a hibernation state the certificate is verified. This includes verifying the creation information to check that the key is created and managed within the security processor. Once this verification has happened the public key within the certificate is registered as the authorised management key, i.e. a term of use. If the verification fails no management keys are registered.

According to an example, device platform features, such as firmware and hardware functionality, can be managed according to terms of use using a private/public key pair that can be created and controlled by a security processor on the device. An example of a security processor may be a Trusted Platform Module (TPM) of the device or a secure crypto-processor. The TPM may be a microchip on the motherboard on the device which can communicate with components of the device via a hardware bus. The private/public key pair may be referred to as management keys. The keys can be validated, as being created in and managed by the TPM, locally for secure management and control of platform features.

According to an example, management keys are generated using a TPM of the device. The management keys that the TPM can generate can relate to a crypto-graphic private/public key pair. The private/public key pair is generated in such a way that the private key can be unencrypted within the TPM. Platform features can be controlled and managed at the local device level based the management public key registered with the platform.

According to an example, the configuration of firmware options and/or lower level components or settings can be delivered via an operating system of the device via the firmware component. The device can be locally or self-managed based on signed commands being generated by the user on the local device from within a management application running on the operating system. The signed commands can be pushed down to the one or more components, such as via the device firmware for example.

According to an example, a threat is an action or process that may lead to a downgrading of security on a device. For example, a threat may occur when the device is infected with malware that has the ability to sign management commands to a component such as the device firmware. In an example, crypto-graphic keys are managed within a TPM using pin-based authorization from a user to mitigate such threats. This security policy can be enforced by the component or firmware in question (to which the signed command relates) accepting only a TPM managed public key (this may represent a term of use). For example, where there is local management or if remote management a properly issued X509 certificate may be provided.

In an example, management keys can be created in a device security processor or TPM and registered with a component, firmware or other system component, such as an additional security processor for example. This provides a method of securely managing platform level features on a local client device secured by keys protected and managed within the security processor or TPM of the device.

Figure 2:
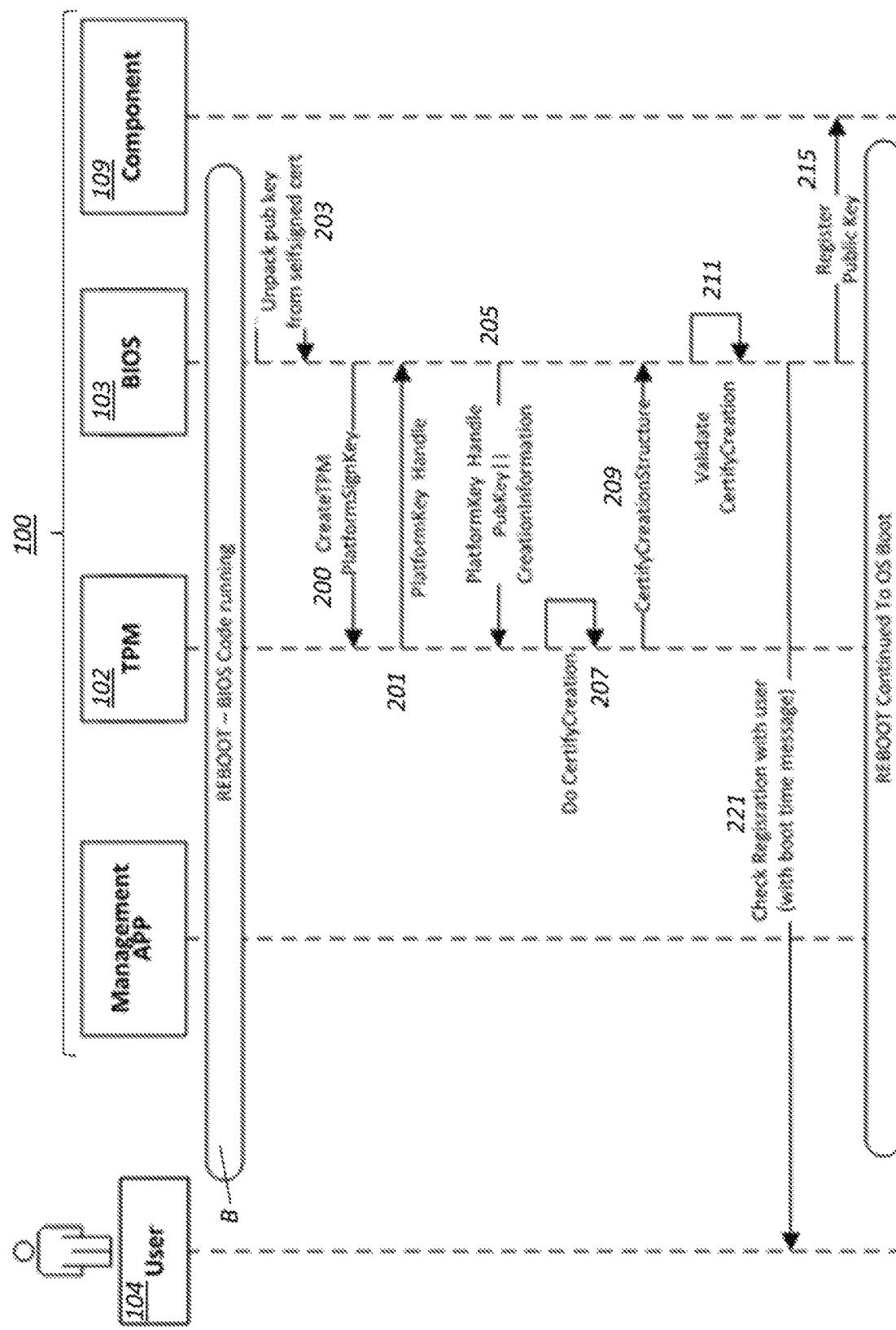
FIG. 2 is a schematic of a reboot validation protocol according to an example.

FIGS. 1 and 2 are schematic representations of process flows or protocols for authenticating a signer according to an example. Referring to FIG. 1, a private/public key pair is generated 101 locally within a security processor or TPM 102 of a device 100 such as a laptop. When the private/public key pair 101 is generated or created, associated creation ticket information 105 can be stored on the OS so that they can be recognised as correct by the security processor or TPM 102. For example, the TPM can be used during the boot process and/or from the OS. In an example, the creation ticket information is retuned to the creator of the key. The ticket is secured so that the TPM can validate that it created the ticket and that it relates to the key. For example, the creation ticket information is signed using an HMAC that only the TPM knows about.

According to an example of a locally managed certification process, the security processor 102 on the local device 100 may:
  during a registration protocol (A), generate a private/public key pair 101 within the security processor (TPM) 102 and save associated TPM creation ticket information 105;
  generate a self-signed certificate 113, where the certificate structure is signed by the private key it is certifying. For example, the TPM ticket creation information can be contained within the certificate as fields within the name field or otherwise supplied separately;
  send or register 115 the self-signed certificate and the TPM creation ticket information at the component 103, 109 as a registration command.

The validated public key is registered 215 with one or more components 109 of the local client device 100, such as the device firmware for example 103. This means that commands signed using this key will be accepted.

According to an example, when the private/public key pair 101 is created by the TPM 102, associated structures are formed and returned from either a "Create" or "CreatePrmary" operation:

"CreationData" structure which defines the terms under which the key was created. This may include any requested PCR measurements, and the name of the parent of the key or terms of use.
"CreationHash" is the hash of the creation data structure.
"CreationTicket" is a HMAC value formed from the "KeyName" (derived from the public key and any associated policies to control key usage) along with the "CreationHash". The HMAC is formed using an internal TPM proof key so that only the TPM can create and validate the ticket.

When the management system creates a key pair, the key pair (and associated structures) is stored or retained within the management system. The "CreationData" structure is encoded into the "CreationHash" and so, if only the existence of the key in the TPM is being checked rather than the creation conditions, then it is not necessary to deal with this structure.

According to an example, when the self-signed certificate 113 is created it can include a subject name that may be made up of a number of fields such as a common name (CN), organization (o) and/or multiple Organizational Unit names (OU). These creation structures can be placed in the OU fields as base64 encoded strings with appropriate identifiers. As such, the application programming interfaces (APIs) can be the same between a remotely and locally managed certification process, since all registration information is shipped in the certificate.

FIG. 2 is a schematic representation of a process flow for validating a certify creation command according to an example. Following registration 115 of the self-signed certificate and public key with the component 109, at the next boot time of the device 100 the component 109 generates a certify creation command 207. The certify creation command 207 is used to verify that the private/public key pair was generated in the local security processor 102, i.e. to confirm whether or not the certify creation command can be trusted. Accordingly, there can be a confirmation, in the trusted execution state, of suitability of use of the public key part of the key pair for authorising management commands.

According to an example, the certify creation command is generated by creating a restricted signing key 201 within the local TPM 102. In an example, the component 103 can decode 203 the public key from the self-signed certificate 113. The public key 101b can be decoded into a form that is loadable into the security processor or TPM 102. The security processor can then create or generate the restricted signing key 201. The public key 101b and creation ticket information 105 can both be loaded 205 into the local TPM 102. The restricted signing key 201 can be used to sign 209 both the loaded public key 101b and the creation ticket information 105. If a resulting structure is created and correctly signed from executing the certify creation instruction then the self-signed certificate and public key are trusted to have been generated in the local security processor or TPM 102 and the CreationData can also be checked to see any policies are applied to the management key. If the signed certify creation structure is verified then the self-signed certificate and public key are trusted.

According to an example, provided that the self-signed certificate and public key are trusted by the firmware component 103, the public key is registered with a configuration component 109 that can then allow a management command to effect changes to security settings of the device 100.

According to an example of a locally managed certification process, the component 103, 109 on the local device 100 may:

at the next boot time (B), look 203 at the registration command 115 and associated certificate and recognize it as a self-signed certificate 113;

create a restricted-signing key 201 within the platform hierarchy of the TPM (or identify one already created 200);

use 205 the public key 101b in the self-signed certificate 113 along with the TPM creation ticket information 105 to form a TPM certify creation command 207;

instruct the TPM 102 to run the certify creation command 207 using the restricted signing key 201 to sign the resulting structure 209;

if the TPM 102 generates the signed structure 209 then the public key 101b is one associated with a TPM created key 101 and as such the private key 101a is managed within the security policy;

if the resulting structure 209 is created then the component 103, 109 (e.g. the UEFI or BIOS) can tell the user 221 that the device system is being registered to be managed locally and/or may display any additional name information in the self-signed certificate 113;

if the TPM 102 does not generate or create a signed structure then an error or an appropriate error message can be given or displayed to the user.

provided that the TPM generates the signed structure and the public key is confirmed to be associated with the TPM created key, the public key is registered with the component in question.

According to an example, the validation process or protocol (B) can include the following steps:

recognize the certificate 113 is self-signed.

decode 203 the subject name fields and look for information relating to the "CreationTicket" and "CreationHash" and if present the "CreationData" structure.

recreate the "CreationTicket" and "CreationHash" (and "CreationData") as binary blobs for TPM loadable commands.

if the "CreationData" is present, check the "CreationData" meets any policies specified and hash it to the "CreationHash".

if the information is present then:
a. decode 203 the public key 101b from the certificate 113 in a form loadable into the TPM 102.
b. use "CreatePrimary" to create a restricted signing key 201 within the platform hierarchy.
c. use the "LoadExternal" TPM command to load the public key into the TPM and obtain a handle to the key.
d. use the "CertifyCreation" TPM command to validate 211 the resulting ticket or structure (and "CreationHash"). If the resulting structure is correct this will lead to the signing of a "TPM2B_ATTEST" structure, otherwise an error is returned.

check that a signature is produced.

if the checks at any stage fail, then the provisioning can be rejected with appropriate messages 221 to the user 104 and logs may be written. The checks may fail if:
a. the self-signed certificate 113 does not contain creation ticket information 105,
b. the creation ticket information 105 does not parse property, or
c. the generation of the "CertifyCreation" signature fails and an error is returned.

If the checks succeed, then the user 104 can be asked to confirm that the management key 101b be installed and data representing the confirmation can be generated.

According to an example, for a remotely managed certification process the private/public key pair may be generated at a management server, or an associated hardware security module (HSM). The local device or enterprise may obtain a certificate (signed by a certificate authority) for the key pair that is associated with their domain. Registration to the local client device may occur with a register command and the certificate may be submitted to a component 103, 109 of the local device, e.g. UEFI or BIOS. On the next boot, the component 109 or UEFI/BIOS 103 can check the self-signed certificate and may display the domain name as an identifier to the user who can accept the registration.

Figure 3:
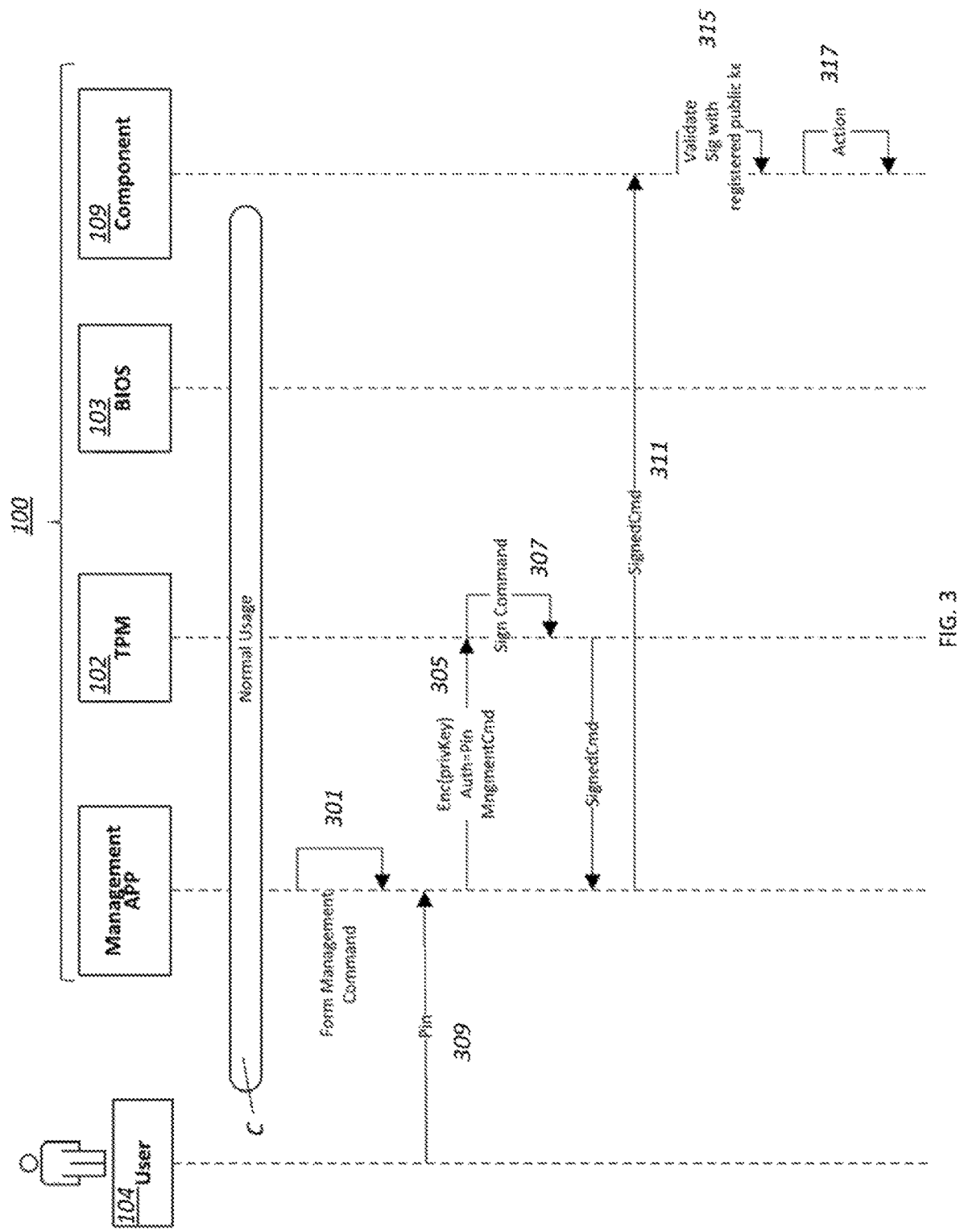
FIG. 3 is a schematic of a normal usage protocol according to an example.

Referring to the example of FIG. 3, a management command 301 can be used to effect one or more changes in the features or firmware settings of the device platform. In an example, the management command 301 can be created using the public key 101b (from the key pair 101 that was generated in the device security processor 102) and the creation ticket information 105. The device TPM 102 can use 305 the private key 101a from the private/public key pair to sign 307 the management command 301 locally. The command 301 may be signed using a pin-based authorisation 309 and by access to a master storage root key stored in the TPM 102. For example, a user 104 of the device can be prompted to enter a PIN number 109. When the management command is signed, a signed command 311 is generated. The signed management command is sent to the configuration component 109 or firmware component 103 (e.g. UEFI/BIOS). According to an example, the component 109 can perform a step of validating 315 that the public key is the registered key in step 215 and hence managed by the security processor or TPM. The signed command can be validated using the public key 101b registered with the configuration or firmware component in question 315. If the command is trusted the requested changes to the configuration settings according to the command are made 317. If the command is not trusted there are no changes made to the configuration settings of the device. As such the component 109 is able to trust the signing key 101b by authenticating the signer. Provided that the management command 301 can be trusted, the component 109 then enforces changes to the configuration of the firmware settings according to the management command 301.

According to an example, for a locally managed certification process each user does not have to go to the expense and challenge of obtaining a domain and associated certificate (as compared with the remotely managed certification process).

According to an example:
1) A Management App creates a management key and tries to register:
   a. Management App creates keys in TPM (protected with a user pin)—management app keeps creation information (creation ticket/creation hash)
   b. Management App uses the TPM to create a self-signed certificate (x509 cert)
   c. The management App then tries to register the self-signed certificate as the management authority through the UEFI/BIOS which will distribute to the appropriate process (this call to register the keys can include a creation ticket/creation hash).
2) On a reboot and prior to booting the OS the UEFI/BIOS validates the management keys:
   a. The UEFI/BIOS checks certificate
      i. if it is self-signed it does these checks
         else if checks certificate is a valid EVCert and shows name to user (but not covering this here)
      ii. Extracts public key from the certificate (managementPublicKey b. The UEFI/BIOS looks at key creation information with the registration command (could be coded in the self-signed cert)
c. The UEFI/BIOS checks the creation information
   i. It creates a restricted signing key in the platform hierarchy
   ii. Using this key it gets the TPM to sign a "CertifyCreation" command hence passes the public key, creation information and the restricted signing key it has just created
   iii. The UEFI/BIOS checks the signed certify creation structure from the TPM to confirm that the managementPublicKey is a TPM managed key (if this fails registration fails)
d. The UEFI/BIOS (still prior to booting the OS) checks with the user that they are expecting a local app to take control of the management
e. If the user says yes the UEFI/BIOS sends the managementPublicKey to the component that will be managed
f. Registration is now complete
3) Normal Usage—When the user wants to change a setting on the component:
a. Form an appropriate command structure using a GUI on the Management App
b. The user enters the pin for the keys
c. The user loads the private key into the TPM and the pin as an authorization value (the TPMs may not store private keys but they can be stored on the OS in encrypted form such that the TPM can decrypt the private keys).
d. The TPM is used to sign the command.
e. The command is sent to the component being managed
f. The component uses the registered managementPublicKey to check the signing and if correct performs the changes, i.e. the component checks that the public key meets the terms of use under which the public key can be used.

Figure 4:
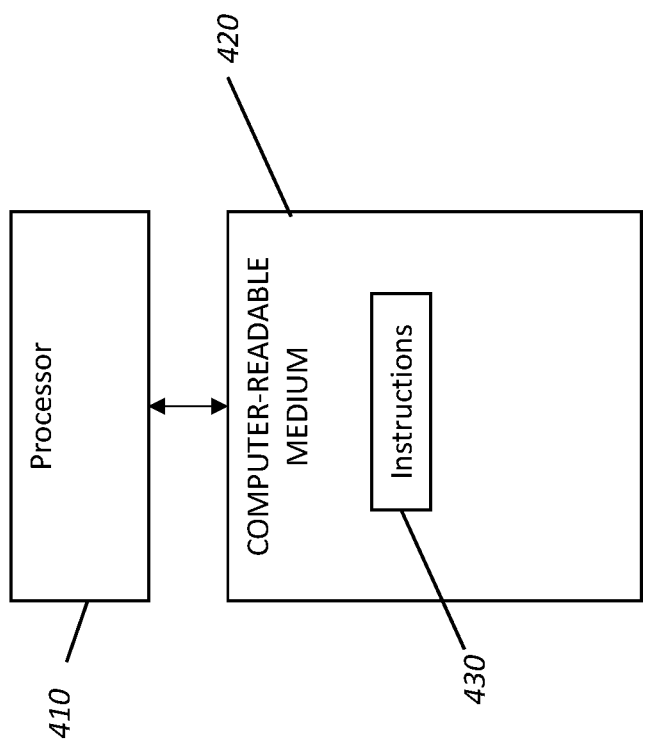
FIG. 4 is a computer-readable medium comprising instructions for carrying out a security protocol according to an example.

FIG. 4 shows a schematic representation of a computer-readable medium comprising instructions for carrying out a protocol according to an example.

The methods described herein protect configuration settings from being updated by malware should the local device be compromised, since the keys are generated and controlled by the security processor which is separate from the operating system. The security of managing the platform level features is increased by the signing of the management commands. This uses a validation process whereby the signing keys are either trusted or not trusted. The cryptographic keys are well managed by the TPM or security processor on the local client device. One of the components of the local device performs a validation of the management keys to check that the keys are created and controlled from within the TPM. This reduces the chance that the keys will be subverted or the platform security features weakened if malware gets hold of the management keys. This allows the user to ensure that platform level features are securely managed when the device is locally managed, i.e. it ensures that the keys are managed through the TPM and hence resilient from software attacks if the device is compromised.

While the method, apparatus and related aspects have been described with reference to certain examples, various modifications, changes, omissions, and substitutions can be made without departing from the spirit of the present disclosure. In particular, a feature or block from one example may be combined with or substituted by a feature/block of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A device platform comprising:
   a security processor; and
   a non-transitory computer readable medium storing instructions executed by the processor, wherein the security processor is to:
   create a private/public cryptographic key pair, and data representing evidence of creation of the private/public cryptographic key pair;
   provide access to the private/public cryptographic key pair and the data from an operating system component of the device platform, wherein a public key part of the private/public cryptographic key pair is to be used to verify a management command;
   generate a certificate comprising creation ticket information and the public key;
   sign the certificate with a private key of the private/public key pair to generate a self-signed certificate;
   register the self-signed certificate and the public key with a basic input/output system (BIOS) of the device platform;
   receive a management command from the BIOS during a subsequent reboot of the device platform, wherein the management command is verified by the BIOS using the public key decoded from the self-signed certificate and the creation ticket information; and
   execute the management command to validate the private/public cryptographic key pair and the data in a trusted execution state of the device platform.

2. The device platform as claimed in claim 1, wherein the security processor is further to:
   receive confirmation, in the trusted execution state, of suitability of use of the public key part of the private/public cryptographic key pair for authorising the management command.

3. The device platform as claimed in claim 1, wherein the security processor is further to:
   check, in the trusted execution state, terms of use for the public key part of the private/public cryptographic key pair, wherein the data representing evidence of creation of the private/public cryptographic key pair includes data representing the terms.

4. The device platform as claimed in claim 1, wherein the security processor is further to:
   enforce changes to security settings according to the management command.

5. A hardware security processor in a device, the hardware security processor to:
   generate a private/public key pair;
   generate creation ticket information;
   provide a certificate comprising the creation ticket information and a public key of the private/public key pair to a device component of the device;
   sign the certificate using a private key of the private/public key pair to generate a self-signed certificate;
   register the self-signed certificate and the public key with a basic input/output system (BIOS) of the device;
   receive a management command from the firmware component during a subsequent reboot of the device, wherein the management command is verified by the BIOS using the public key decoded from the self-signed certificate and the creation ticket information; and execute the management command to validate the private/public key pair and the data.

6. The hardware security processor as claimed in claim 5, wherein the management command comprises a certify creation command and the hardware security processor is further to:

generate a restricted signing key;

sign a structure resulting from the certify creation command using the restricted signing key; and validate the public key.

7. The hardware security processor as claimed in claim 6, further to: transmit the validated public key to a configuration component.

8. The hardware security processor as claimed in claim 5, further to: enforce changes to security settings of the device according to a management command.

9. A non-transitory machine-readable storage medium encoded with instructions executable by a processor in a device platform, the non-transitory machine-readable storage medium comprising instructions to:

enable access, from an operating system component of the device platform, to a private/public cryptographic key pair, and data representing evidence of creation of the private/public cryptographic key pair, wherein a public key part of the private/public cryptographic key pair is to be used to verify a management command;

generate a certificate comprising creation ticket information and the public key;

sign the certificate with a private key of the private/public key pair to generate a self-signed certificate;

register the self-signed certificate and the public key with a basic input/output system (BIOS) of the device platform;

receive a management command from the BIOS during a subsequent reboot of the device platform, wherein the management command is verified by the BIOS using the public key decoded from the self-signed certificate and the creation ticket information; and execute the management command to validate the private/public cryptographic key pair and the data in a trusted execution state of the device platform.

10. The non-transitory machine-readable storage medium as claimed in claim 9, wherein the management command comprises a certify creation command and the non-transitory machine-readable storage medium is further encoded with instructions to:

generate a restricted signing key;

sign a structure resulting from the certify creation command using the restricted signing key; and validate the public key.

11. The non-transitory machine-readable storage medium as claimed in claim 10, further encoded with instructions to:

receive data representing confirmation that the public key is being registered as a management key.

12. The non-transitory machine-readable storage medium as claimed in claim 10, further encoded with instructions to:

validate a policy using the creation ticket information.

13. The non-transitory machine-readable storage medium as claimed in claim 10, further encoded with instructions to:

transmit the public key that is validated to a configuration component.

14. The non-transitory machine-readable storage medium as claimed in claim 9, further encoded with instructions to:

enforce changes to security settings of the device according to a management command.

15. The non-transitory machine-readable storage medium as claimed in claim 9, further encoded with instructions to:

check, in the trusted execution state, terms under which a public key part of the private/public cryptographic key pair can be used, wherein the data representing evidence of creation of the private/public cryptographic key pair includes data representing the terms.

\* \* \* \* \*